(12) United States Patent
Shen et al.

(10) Patent No.: US 8,681,653 B2
(45) Date of Patent: Mar. 25, 2014

(54) METHOD, SYSTEM AND APPARATUS FOR TRANSMITTING CHANNEL QUALITY INDICATOR INFORMATION OF MULTIPLE USER TERMINALS

(75) Inventors: Zukang Shen, Beijing (CN); Xueming Pan, Beijing (CN); Yanan Lin, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 76 days.

(21) Appl. No.: 13/391,279

(22) PCT Filed: Aug. 17, 2010

(86) PCT No.: PCT/CN2010/001248
§ 371 (c)(1), (2), (4) Date: Feb. 17, 2012

(87) PCT Pub. No.: WO2011/020297
PCT Pub. Date: Feb. 24, 2011

(65) Prior Publication Data
US 2012/0147775 A1    Jun. 14, 2012

(30) Foreign Application Priority Data
Aug. 17, 2009   (CN) .......................... 2009 1 0091275

(51) Int. Cl.
*H04L 12/26* (2006.01)
*H04L 12/56* (2011.01)
(52) U.S. Cl.
CPC ..................................... *H04L 47/10* (2013.01)
USPC ........................................................ 370/252
(58) Field of Classification Search
USPC ........................................................ 370/252
See application file for complete search history.

(56) References Cited

U.S. PATENT DOCUMENTS

2004/0066754 A1 * 4/2004 Hottinen ....................... 370/252
2008/0043865 A1   2/2008 Kim et al.
(Continued)

FOREIGN PATENT DOCUMENTS

CN   101132256 A     2/2008
CN   101132256 B  *  2/2008   ................ H04L 1/06
(Continued)

OTHER PUBLICATIONS

PCT International Search Report for PCT Counterpart Application No. PCT/CN2010/001248 containing Communication relating to the Results of the International Search Report, 8 pgs., (Nov. 25, 2010).

(Continued)

*Primary Examiner* — Phuongchau B Nguyen
(74) *Attorney, Agent, or Firm* — Blakely, Sokoloff, Taylor & Zafman LLP

(57) ABSTRACT

Provide are a method, a system and an apparatus for transmitting channel quality indicator information of multiple user terminals. The method includes: at least two user terminals transmit their own channel quality indicator information using the same time and frequency resources, wherein the time and frequency resources include at least one frequency-domain unit in frequency domain and at least two sets of data time-domain units in time domain, each set of data time-domain units including at least two data time-domain units; and the channel quality indicator information of each user terminal is transmitted on at least one set of data time-domain units by means of time-domain Code Division Multiple Address. Therefore, it is possible to adjust the transmitted bits according to size of the channel quality indicator information.

10 Claims, 6 Drawing Sheets

(56) References Cited

U.S. PATENT DOCUMENTS

2010/0284394 A1* 11/2010 Takata et al. ............... 370/343
2012/0147775 A1* 6/2012 Shen et al. .................. 370/252

FOREIGN PATENT DOCUMENTS

| EP | 2207291 A1 * | 4/2010 | ............. H04B 1/707 |
| WO | WO 2008/038112 A2 | 4/2008 | |
| WO | WO 2009/011523 A1 | 1/2009 | |
| WO | WO 2009/022293 A2 | 2/2009 | |

OTHER PUBLICATIONS

PCT Written Opinion of the International Searching Authority for PCT Counterpart Application No. PCT/CN2010/001248, 8 pgs., (Nov. 25, 2010).

PCT Notification concerning Transmittal of International Preliminary Report on Patentability (Chapter I of the Patent Cooperation Treaty) for PCT Counterpart Application No. PCT/CN2010/001248, 11 pgs., (Mar. 1, 2012).

EPO Extended Search Report for European Counterpart Application No. 10809431.9, 10 pages, (Dec. 6, 2012).

Nokia, "Multiplexing of L1/L2 Control Signaling when UE has No Data to Transmit", 3GPP TSG RAN WG1 #47, Draft No. R1-063380, Riga, Latvia, XP50103822A, 6 pages, (Nov. 6-10, 2006).

Catt, "CQI Feedback for LTE-A", 3GPP TSG RAN WG1 Meeting #61bis, Draft No. R1-103474, Dresden, Germany, XP50448994, 7 pages, (Jun. 28-Jul. 2, 2010).

* cited by examiner

US 8,681,653 B2

METHOD, SYSTEM AND APPARATUS FOR TRANSMITTING CHANNEL QUALITY INDICATOR INFORMATION OF MULTIPLE USER TERMINALS

CROSS REFERENCE TO RELATED APPLICATIONS

The present application is a US National Stage of International Application No. PCT/CN2010/001248, filed 17 Aug. 2010, designating the United States, and claiming priority to Chinese Patent Application No. 200910091275.X, filed 17 Aug. 2009.

FIELD

The present invention relates to the field of communications and particularly to a method and device for transmitting channel quality indicator information of a plurality of user equipments.

BACKGROUND

A User Equipment (UE) has to feed back Channel Quality Indicator (CQI) information on an uplink channel in a Third Generation Partnership Project (3GPP) Release-8 (Rel-8) Long Term Evolution (LTE) system. A base station (eNB) can perform downlink dynamic scheduling with use of a CQI fed back from the UE. A CQI can be transmitted on a Physical Uplink Control Channel (PUCCH) or a Physical Uplink Shared Channel (PUSCH). In the 3GPP LTE, a Physical Resource Block (PRB) is consisted of twelve Resource Elements (REs) each with a bandwidth of 15 KHz.

FIG. 1 is a schematic diagram of feeding back a CQI on a PUCCH in a 3GPP R8 LTE system. Referring to FIG. 1, each sub-frame is consisted of a series of Orthogonal Frequency Division Multiplexing (OFDM) symbols. Taking a normal CP length as an example, a sub-frame is consisted of two slots each including seven OFDM symbols. CQIs of a plurality of UE are transmitted in each PUCCH OFDM symbol in a CDM mode. Twelve UEs at most can transmit their respective CQIs concurrently in a PRB. Each slot includes two OFDM symbols each as a Reference Signal (RS) and five symbols in which CQI data is transmitted. Each UE can transmit 2-bit channel-encoded CQI data through QPSK in an OFDM data symbol. Therefore in the 3GPP LTE, each UE can transmit 20 encoded CQI data in a sub-frame on a PUCCH. Reference can be made to 3GPP TS36.211, 3GPP TS 36.212 and 3GPP TS 36.213 for details.

In a 3GPP LTE system, a CQI can be transmitted together with data or separately on a PUSCH. FIG. 2 illustrates a schematic diagram of transmitting a CQI separately on a PUSCH in the prior art. Referring to FIG. 2, each slot includes only one Reference Signal (RS) symbol and six data OFDM symbols to transmit the CQI on the PUSCH. 24 encoded CQI bits can be transmitted in each PRB in a QPSK modulation mode in each data OFDM symbol. Therefore in the 3GPP LTE, 288 encoded CQI bits can be carried in a PRB to transmit the CQI separately on the PUSCH. There are typically several tens to hundreds of bits of CQI information on the PUSCH. The transmission of the CQI on the PUSCH is not in a multi-user CDM mode, that is, a CQI of only one user can be transmitted in a PUSCH PRB. Reference can be made to 3GPP TS36.211, 3GPP TS 36.212 and 3GPP TS 36.213 for details.

In a 3GPP LTE-A system, users may have to feed back a larger number of CIQ bits in order to support a more advanced transmission mode. Therefore in the 3GPP LTE-A, the CQI feedback demand can not be accommodated effectively in the Rel-8 PUCCH CQI transmission mode. The use of the Rel-8 PUCCH CQI transmission mode may result in an increased CQI feedback overhead because a PRB can be used for only one UE. In view of 20-bit encoded Rel-8 PUCCH CQI data and 288-bit encoded Rel-8 PUSCH CQI data, it is necessary to devise in the 3GPP LTE-A a new transmission mode in which a CQI is fed back to thereby support effectively a number of sizes of an encoded CQI block while reducing a CQI feedback overhead to the largest extent.

SUMMARY

The invention provides a method and device for transmitting channel quality indicator information of a plurality of user equipments, which can support a number of sizes of an encoded COI block while reducing a CQI feedback overhead to the largest extent.

An embodiment of the invention provides a method for transmitting channel quality indicator information of a plurality of user equipments, which includes:

at least two user equipments transmitting their respective channel quality indicator information on the same time-frequency resource including at least one frequency-domain unit in the frequency domain and at least two sets of data time-domain units in the time domain, each of which includes at least two data time-domain units, by transmitting the channel quality indicator information of each user equipment in a time-domain code division multiple access mode on at least one set of data time-domain units.

An embodiment of the invention provides a system for transmitting channel quality indicator information of a plurality of user equipments, which includes at least two user equipments:

each configured to transmit channel quality indicator information on the same time-frequency resource including at least one frequency-domain unit in the frequency domain and at least two sets of data time-domain units in the time domain, each of which is consisted of at least two data time-domain units, by transmitting the channel quality indicator information in a time-domain code division multiple access mode on at least one set of data time-domain units.

An embodiment of the invention provides a device for transmitting channel quality indicator information, which includes:

an acquiring unit configured to generate channel quality indicator information; and a first transmitting unit configured to transmit the channel quality indicator information on a preset time-frequency resource by transmitting the channel quality indicator information in a time-domain code division multiple access mode on at least one set of data time-domain units in the time-frequency resource, wherein the time-frequency resource includes at least one frequency-domain unit in the frequency domain and at least two sets of data time-domain units in the time domain, each of which includes at least two data time-domain units.

An embodiment of the invention provides a device for receiving channel quality indicator information, which includes:

a detecting unit configured to detect a time-frequency resource; and a first receiving unit configured to receive channel quality indicator information on a detected preset time-frequency resource by receiving the channel quality indicator information in a time-domain code division multiple access mode on at least one set of data time-domain units in the detected preset time-frequency resource, wherein the time-frequency resource includes at least one frequency-domain unit in the frequency domain and at least two sets of data time-domain units in the time domain, each of which includes at least two data time-domain units.

In the embodiments of the invention, a plurality of user equipments transmit their respective channel quality indicator information on the same time-frequency resource, and the channel quality indicator information of each user equipment is transmitted in a time-domain code division multiple access mode on at least one set of data time-domain units. Therefore the number of transmitted bits can be adjusted according to the size of the channel quality indicator information.

DETAILED DESCRIPTION

In embodiments of the invention, a plurality of user equipments transmit their respective channel quality indicator information on the same time-frequency resource, and the channel quality indicator information of each user equipment is transmitted on at least one set of data time-domain units in a time-domain code division multiple access mode.

Figure 1:
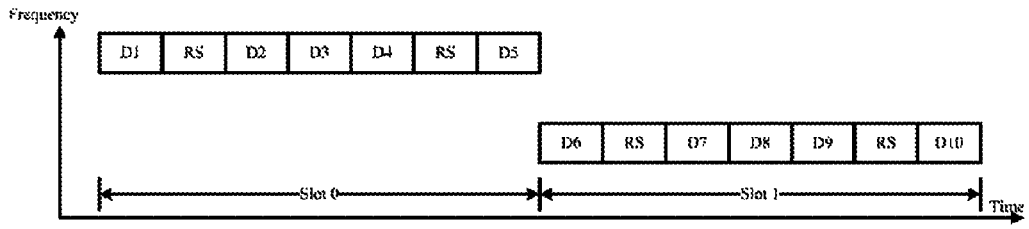
FIG. 1 is a schematic diagram of feeding back a CQI on a PUCCH in a 3GPP R8 LTE system.
Figure 2:
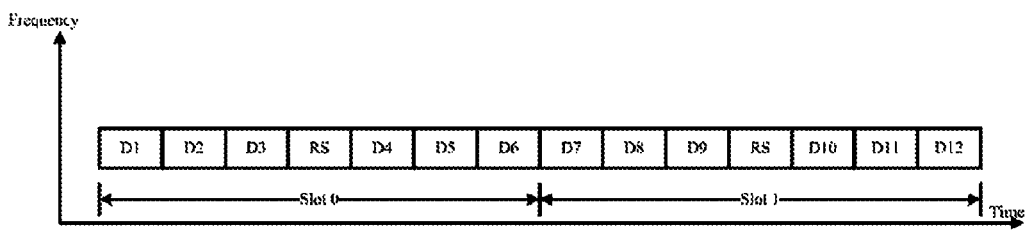
FIG. 2 illustrates a schematic diagram of transmitting a CQI separately on a PUSCH in the prior art.
Figure 3:
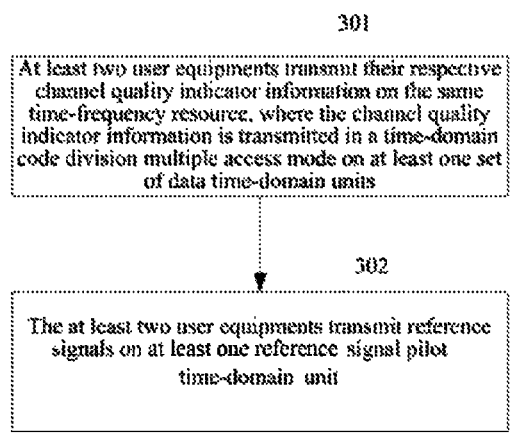
FIG. 3 is a schematic flow chart of a method according to an embodiment of the invention.

Referring to FIG. 3, a specific process of a method according to an embodiment of the invention is as follows:

Operation 301: At least two user equipments transmit their respective channel quality indicator information on the same time-frequency resource by transmitting the channel quality indicator information in a time-domain code division multiple access mode on at least one set of data time-domain units, where the time-frequency resource includes at least one frequency-domain unit in the frequency domain and at least two sets of data time-domain units in the time domain, each of which includes at least two data time-domain units.

Here the operation 301 can be performed as follows:

Each of the user equipments transmits channel quality indicator information on at least one set of data time-domain units in a time-domain code division multiple access mode, and this includes:

Each of the user equipments generates at least one channel quality indicator symbol from the channel quality indicator information, and each channel quality indicator symbol corresponds to at least one set of data time-domain units; and The user equipment presets a time-domain frequency-spreading code including the same number of elements as the number of data time-domain units in each set of data time-domain units, and each element in the time-domain frequency-spreading code corresponds to one of the data time-domain units in the corresponding set of data time-domain units; and the user equipment multiplies each channel quality indicator symbol by the corresponding element in the time-domain frequency-spreading code and then transmits the product in the corresponding data time-domain unit.

In an embodiment of the invention, different channel quality indicator symbols can correspond to different sets of data time-domain units. A plurality of sets of data time-domain units can also correspond to the same one channel quality indicator symbol.

The time-domain frequency-spreading codes of the different user equipments on the same time-frequency resource are orthogonal in the set of data time-domain units.

Operation 302: The at least two user equipments transmit reference signals in at least one reference signal time-domain unit, where the time-frequency resource further includes a set of reference signal time-domain units including at least one reference signal time-domain unit.

Here the reference signals transmitted from the different user equipments on the same reference signal time-domain resource are orthogonal in the at least one reference signal time-domain unit.

It shall be noted that the operation 301 and the operation 302 may not necessarily be performed in any specific order, and transmission can occur particularly in an order in which the transmission information is configured in a sub-frame.

Therefore a specific user equipment shall transmit its channel quality indicator information on a preset time-frequency resource, and the channel quality indicator information is transmitted in a time-domain code division multiple access mode on at least one set of data time-domain units, where the time-frequency resource includes at least one frequency-domain unit in the frequency domain and at least two sets of data time-domain units in the time domain, each of which includes at least two data time-domain units.

The technical solution of the method according to the invention will further be described below with reference to the drawings.

First Embodiment

Figure 4:
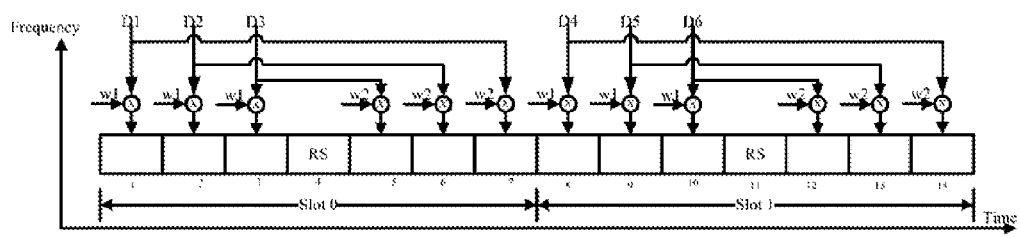
FIG. 4 illustrates an embodiment in which two UEs are supported so that 144-bit encoded CQI bits of each UE can be transmitted without frequency hopping.

FIG. 4 illustrates the use of a time-domain CDM mode in which two CQI UEs are supported in a PRB. Each CQI UE can transmit 144 encoded CQI bits in a sub-frame. Particularly [D1, D2, . . . , D6] represents corresponding CQI data. With the use of a QPSK modulation mode, each CQI data symbol Di includes 24 encoded CQI bits. Both w1 and w2 are scalars. As illustrated in FIG. 4, there are six CQI data symbols of D1, D2, D3, D4, D5 and D6 for a UE. A time-frequency resource includes six sets of data time-domain units, and a CQI data symbol corresponds to one set of data time-domain units. Particularly the set of data time-domain units 1 includes a symbol 1 and a symbol 7, the set of data time-domain units 2 includes a symbol 2 and a symbol 6, the set of data time-domain units 3 includes a symbol 3 and a symbol 5, the set of data time-domain units 4 includes a symbol 8 and a symbol 14, the set of data time-domain units 5 includes a symbol 9 and a symbol 13, and the set of data time-domain units 6 includes a symbol 10 and a symbol 12. Each symbol is a data time-domain unit. In an OFDM system, each data time-domain unit corresponds to one OFDM symbol. Each CQI data symbol is multiplied by corresponding wi and then transmitted in an OFDM symbol. [w1, w2] of the different UEs are orthogonal. Any orthogonal sequence can be taken as [w1, w2]. For example, there are [w1, w2]=[1, 1] for the CQI UE1 and [w1, w2]=[1, −1] for the CQI UE2.

Figure 5:
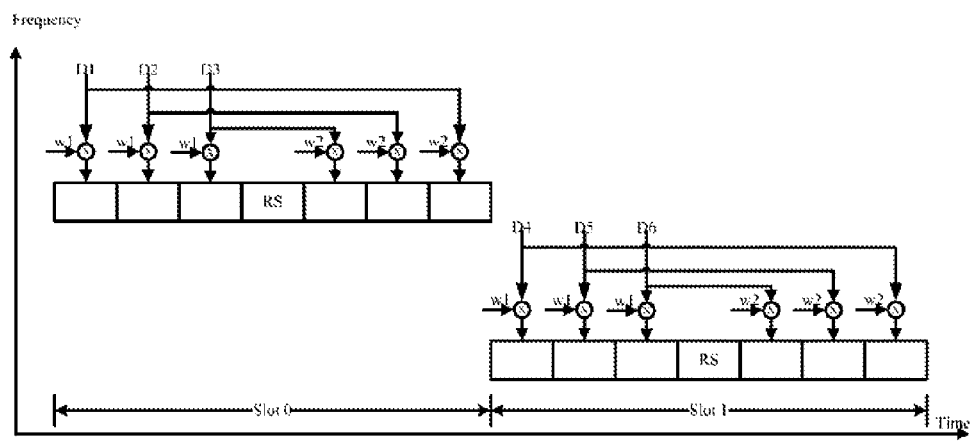
FIG. 5 illustrates an embodiment in which two UEs are supported so that 144-bit encoded CQI bits of each UE can be transmitted with frequency hopping.

Similarly FIG. 5 illustrates the use of a frequency-hopping mode in which two CQI UEs can be supported in a PRB and each CQI UE can transmit 144 CQI bits.

Second Embodiment

Figure 6:
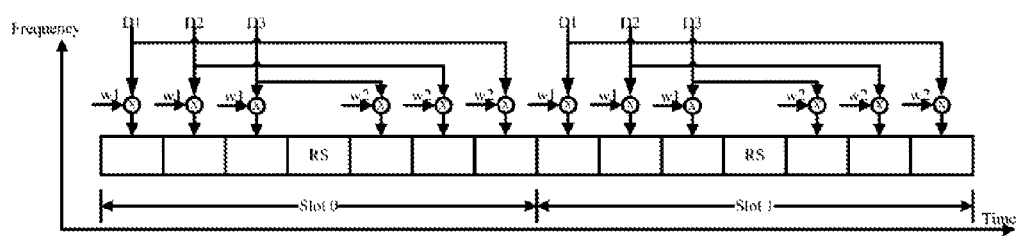
FIG. 6 illustrates an embodiment in which two UEs are supported so that 72-bit encoded CQI bits of each UE can be transmitted without frequency hopping.

FIG. 6 illustrates the use of a time-domain CDM mode in which two CQI UEs are supported in a PRB. Each CQI UE can transmit 72 encoded CQI bits in a sub-frame. Particularly [D1, D2, D3] represents corresponding CQI data. With the use of a QPSK modulation mode, each CQI data symbol Di includes 24 encoded CQI bits. Both w1 and w2 are scalars. As illustrated in FIG. 6, a sub-frame in the figure includes 14 symbols numbered 1 to 14, the number of none of the symbols is illustrated in the figure, and they are numbered in the same order as in FIG. 4. There are three CQI data symbols for a UE. A time-frequency resource includes six sets of data time-domain units, and a CQI data symbol corresponds to two sets of data time-domain units. Particularly the set of data time-domain units 1 includes a symbol 1 and a symbol 7, the set of data time-domain units 2 includes a symbol 2 and a symbol 6, the set of data time-domain units 3 includes a symbol 3 and a symbol 5, the set of data time-domain units 4 includes a symbol 8 and a symbol 14, the set of data time-domain units 5 includes a symbol 9 and a symbol 13, and the set of data time-domain units 6 includes a symbol 10 and a symbol 12. Each symbol is a data time-domain unit. In an OFDM system, each data time-domain unit corresponds to one OFDM symbol. Each CQI data symbol is multiplied by corresponding wi and then transmitted in an OFDM symbol. [w1, w2] of the different UEs are orthogonal. Any orthogonal sequence can be taken as [w1, w2]. For example, there are [w1, w2]=[1, 1] for the CQI UE1 and [w1, w2]=[1, −1] for the CQI UE2. Copies of the same signal are transmitted in two slots.

Figure 7:
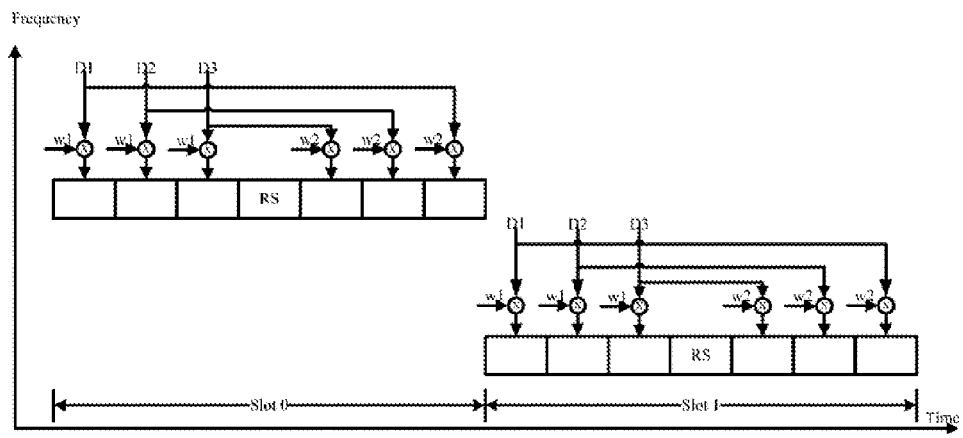
FIG. 7 illustrates an embodiment in which two UEs are supported so that 72-bit encoded CQI bits of each UE can be transmitted with frequency hopping.

Similarly FIG. 7 illustrates the use of a frequency-hopping mode in which two CQI UEs can be supported in a PRB and each CQI UE can transmit 72 CQI bits.

Third Embodiment

Figure 8:
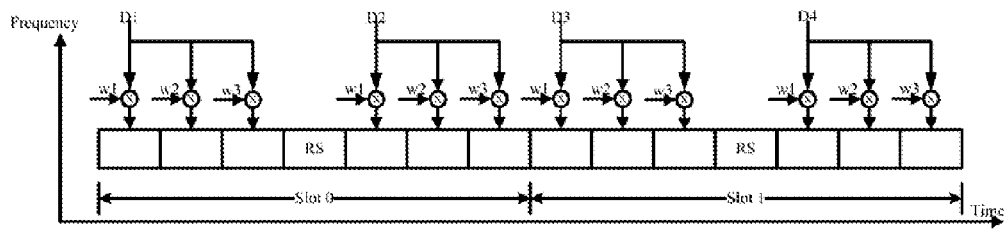
FIG. 8 illustrates an embodiment in which three UEs are supported so that 96-bit encoded CQI bits of each UE can be transmitted without frequency hopping.

FIG. 8 illustrates the use of a time-domain CDM mode in which three CQI UEs are supported in a PRB. Each CQI UE can transmit 96 encoded CQI bits in a sub-frame. Particularly [D1, D2, D3, D4] represents corresponding CQI data. A sub-frame in the figure includes 14 symbols numbered 1 to 14, the number of none of the symbols is illustrated in the figure, and they are numbered in the same order as in FIG. 4. There are four CQI data symbols for a UE. A time-frequency resource includes four sets of data time-domain units, and a CQI data symbol corresponds to one set of data time-domain units. Particularly the set of data time-domain units 1 includes a symbol 1 to a symbol 3, the set of data time-domain units 2 includes a symbol 5 to a symbol 7, the set of data time-domain units 3 includes a symbol 6 to a symbol 10, and the set of data time-domain units 4 includes a symbol 12 to a symbol 14. Each symbol is a data time-domain unit. In an OFDM system, each data time-domain unit corresponds to one OFDM symbol. With the use of a QPSK modulation mode, each CQI data symbol Di includes 24 encoded CQI bits. All of w1, w2 and w3 are scalars. As illustrated in FIG. 8, each CQI data symbol is multiplied by corresponding wi and then transmitted in an OFDM symbol. [w1, w2, w3] of the different UEs are orthogonal. Any orthogonal sequence can be taken as [w1, w2, w3]. For example, there are [w1, w2, w3]=[1, 1, 1] for the CQI UE1, [w1, w2, w3]=[1, $e^{j2\pi/3}$, $e^{j4\pi/3}$] for the CQI UE2 and [w1, w2, w3]=[1, $e_{j4\pi/3}$, $e^{j2\pi/3}$] for the CQI UE3.

Figure 9:
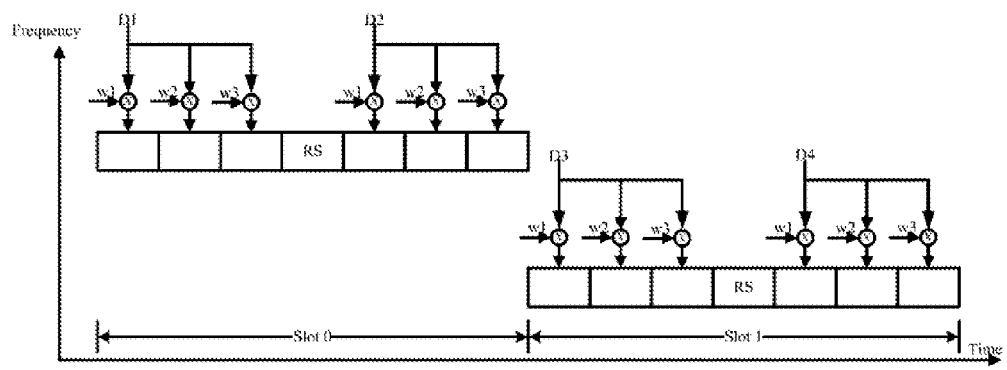
FIG. 9 illustrates an embodiment in which three UEs are supported so that 96-bit encoded CQI bits of each UE can be transmitted with frequency hopping.

Similarly FIG. 9 illustrates the use of a frequency-hopping mode in which three CQI UEs can be supported in a PRB and each CQI UE can transmit 96 CQI bits.

Fourth Embodiment

Figure 10:
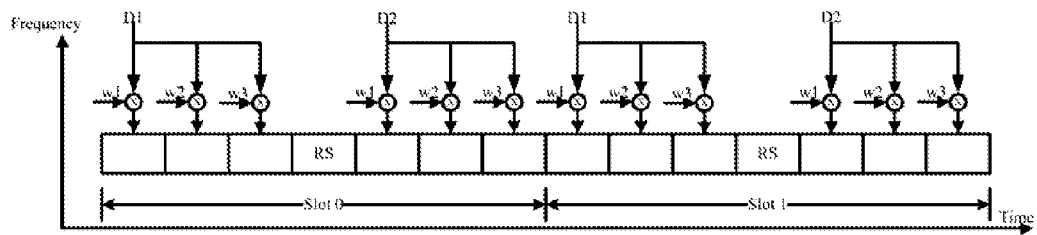
FIG. 10 illustrates an embodiment in which three UEs are supported so that 48-bit encoded CQI bits of each UE can be transmitted without frequency hopping.
Figure 11:
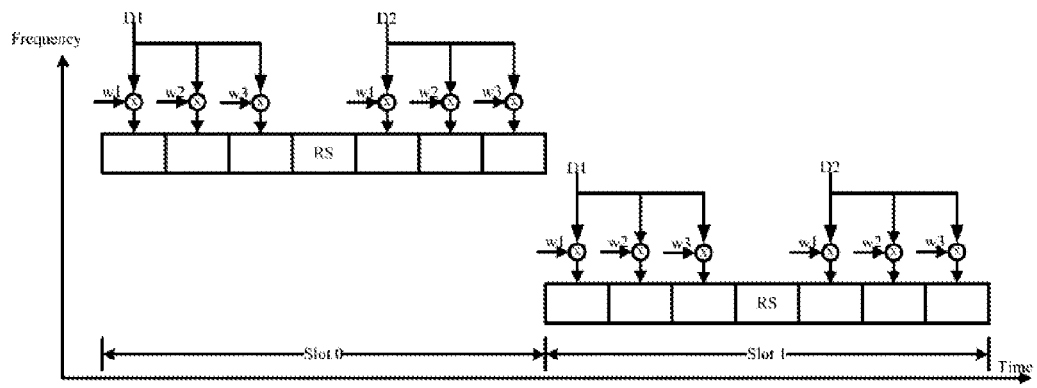
FIG. 11 illustrates an embodiment in which three UEs are supported so that 48-bit encoded CQI bits of each UE can be transmitted with frequency hopping.

FIG. 10 illustrates the use of a time-domain CDM mode in which three CQI UEs are supported in a PRB. Each CQI UE can transmit 48 encoded CQI bits in a sub-frame. Particularly [D1, D2] represents corresponding CQI data. A sub-frame in the figure includes 14 symbols numbered 1 to 14, the number of none of the symbols is illustrated in the figure, and they are numbered in the same order as in FIG. 4. There are two CQI data symbols for a UE. A time-frequency resource includes four sets of data time-domain units, and a CQI data symbol corresponds to two sets of data time-domain units. Particularly the set of data time-domain units 1 includes a symbol 1 to a symbol 3, the set of data time-domain units 2 includes a symbol 5 to a symbol 7, the set of data time-domain units 3 includes a symbol 8 to a symbol 10, and the set of data time-domain units 4 includes a symbol 12 to a symbol 14. Each symbol is a data time-domain unit. In an OFDM system, each data time-domain unit corresponds to one OFDM symbol. With the use of a QPSK modulation mode, each CQI data symbol Di includes 24 encoded CQI bits. All of w1, w2 and w3 are scalars. As illustrated in FIG. 10, each CQI data symbol is multiplied by corresponding wi and then transmitted in an OFDM symbol. [w1, w2, w3] of the different UEs are orthogonal. Any orthogonal sequence can be taken as [w1, w2, w3]. For example, there are [w1, w2, w3]=[1, 1, 1] for the CQI UE1, [w1, w2, w3]=[1, $e^{j4\pi/3}$, $e^{j2\pi3}$] for the CQI UE2 and [w1, w2, w3]=[1, $e^{j4\pi/3}$, $e^{j2\pi/3}$] for the CQI UE3. Similarly FIG. 11 illustrates the use of a frequency-hopping mode in which three CQI UEs can be supported in a PRB and each CQI UE can transmit 48 CQI bits.

Fifth Embodiment

Figure 12:
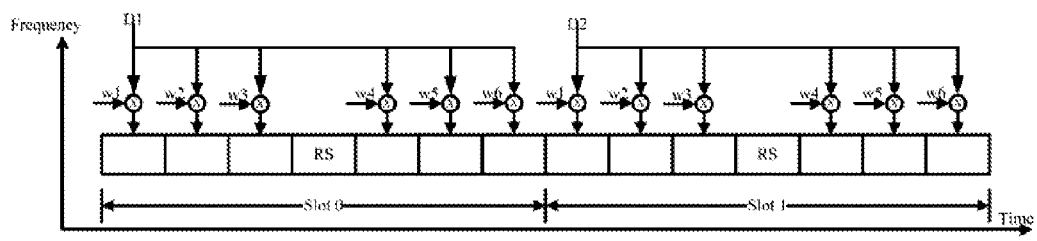
FIG. 12 illustrates an embodiment in which six UEs are supported so that 48-bit encoded CQI bits of each UE can be transmitted without frequency hopping.

FIG. 12 illustrates the use of a time-domain CDM mode in which six CQI UEs are supported in a PRB. Each CQI UE can transmit 48 encoded CQI bits in a sub-frame. Particularly [D1, D2] represents corresponding CQI data. A sub-frame in the figure includes 14 symbols numbered 1 to 14, the number of none of the symbols is illustrated in the figure, and they are numbered in the same order as in FIG. 4. There are two CQI data symbols for a UE. A time-frequency resource includes two sets of data time-domain units, and a CQI data symbol corresponds to one set of data time-domain units. Particularly the set of data time-domain units 1 includes a symbol 1 to a symbol 3 and a symbol 5 to a symbol 7, and the set of data time-domain units 2 includes a symbol 8 to a symbol 10 and a symbol 12 to a symbol 14. Each symbol is a data time-domain unit. In an OFDM system, each data time-domain unit corresponds to one OFDM symbol. With the use of a QPSK modulation mode, each CQI data symbol Di includes 24 encoded CQI bits. All of w1, w2, w3, w4, w5 and w6 are scalars. As illustrated in FIG. 12, each CQI data symbol is multiplied by corresponding wi and then transmitted in an OFDM symbol. [w1, w2, w3, w4, w5, w6] of the different UEs are orthogonal. Any orthogonal sequence can be taken as [w1, w2, w3, w4, w5, w6]. For example:

There are [w1, w2, w3, w4, w5, w6]=[1, 1, 1, 1, 1, 1] for the CQI UE1,

[w1, w2, w3, w4, w5, w6]=[1, $e^{j2\pi/6}$, $e^{j4\pi/6}$, −1, $e^{j8\pi/6}$, $e^{j10\pi/6}$] for the CQI UE2,

[w1, w2, w3, w4, w5, w6]=[1, $e^{j4\pi/6}$, $e^{j8\pi/6}$, 1, $e^{j4\pi/6}$, $e^{j8\pi/6}$] for the CQI UE3,

[w1, w2, w3, w4, w5, w6]=[1, −1, 1, −1, 1, −1] for the CQI UE4,

[w1, w2, w3, w4, w5, w6]=[1, $e^{j8\pi/6}$, $e^{j4\pi/6}$, 1, $e^{j8\pi/6}$, $e^{j4\pi/6}$] for the CQI UE5, and

[w1, w2, w3, w4, w5, w6]=[1, $e^{j10\pi/6}$, $e^{j8\pi/6}$, −1, $e^{j4\pi/6}$, $e^{j2\pi/6}$] for the CQI UE6.

Figure 13:
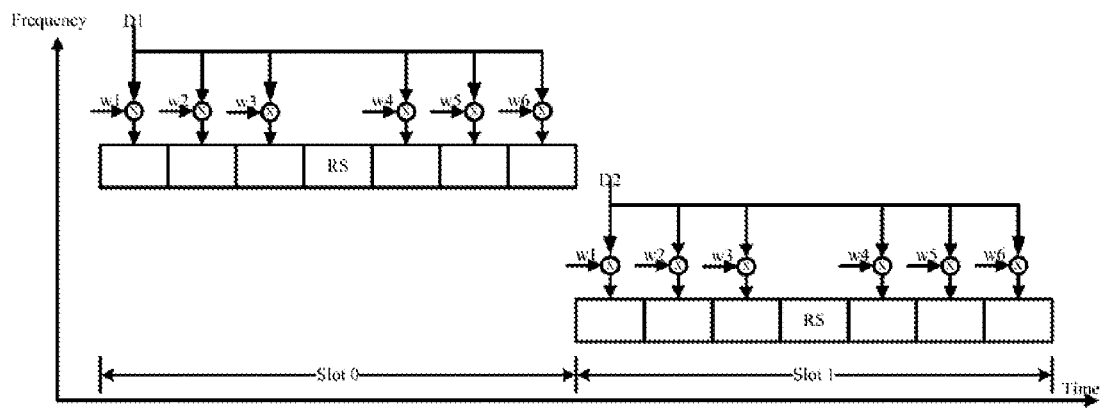
FIG. 13 illustrates an embodiment in which six UEs are supported so that 48-bit encoded CQI bits of each UE can be transmitted with frequency hopping.

Similarly FIG. 13 illustrates the use of a frequency-hopping mode in which six CQI UEs can be supported in a PRB and each CQI UE can transmit 48 CQI bits.

Sixth Embodiment

Figure 14:
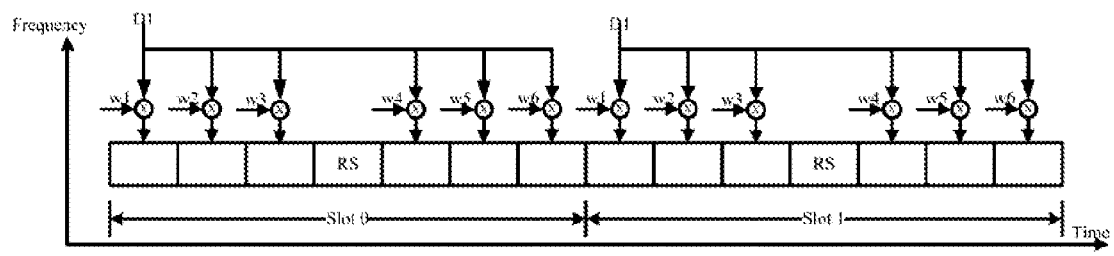
FIG. 14 illustrates an embodiment in which six UEs are supported so that 24-bit encoded CQI bits of each UE can be transmitted without frequency hopping.

FIG. 14 illustrates the use of a time-domain CDM mode in which six CQI UEs are supported in a PRB. Each CQI UE can transmit 24 encoded CQI bits in a sub-frame. Particularly D1 represents corresponding CQI data. A sub-frame in the figure includes 14 symbols numbered 1 to 14, the number of none of the symbols is illustrated in the figure, and they are numbered in the same order as in FIG. 4. There is one CQI data symbol for a UE. A time-frequency resource includes two sets of data time-domain units, and a CQI data symbol corresponds to two sets of data time-domain units. Particularly the set of data time-domain units 1 includes a symbol 1 to a symbol 3 and a symbol 5 to a symbol 7, and the set of data time-domain units 2 includes a symbol 8 to a symbol 10 and a symbol 12 to a symbol 14. Each symbol is a data time-domain unit. In an OFDM system, each data time-domain unit corresponds to one OFDM symbol. With the use of a QPSK modulation mode, each CQI data symbol Di includes 24 encoded CQI bits. All of w1, w2, w3, w4, w5 and w6 are scalars. As illustrated in FIG. 14, each CQI data symbol is multiplied by corresponding wi and then transmitted in an OFDM symbol. [w1, w2, w3, w4, w5, w6] of the different UEs are orthogonal. Any orthogonal sequence can be taken as [w1, w2, w3, w4, w5, w6]. For example:

There are [w1, w2, w3, w4, w5, w6]=[1, 1, 1, 1, 1, 1] for the CQI UE1,

[w1, w2, w3, w4, w5, w6]=[1, $e^{j2\pi/6}$, $e^{j4\pi/6}$, −1, $e^{j8\pi/6}$, $e^{j10\pi/6}$] for the CQI UE2,

[w1, w2, w3, w4, w5, w6]=[1, $e^{j4\pi/6}$, $e^{j8\pi/6}$, 1, $e^{j4\pi/6}$, $e^{j8\pi/6}$] for the CQI UE3,

[w1, w2, w3, w4, w5, w6]=[1, −1, 1, −1, 1, −1] for the CQI UE4,

[w1, w2, w3, w4, w5, w6]=[1, $e^{j8\pi/6}$, $e^{j4\pi/6}$, 1, $e^{j8\pi/6}$, $e^{j4\pi/6}$] for the CQI UE5, and

[w1, w2, w3, w4, w5, w6]=[1, $e^{j10\pi/6}$, $e^{j8\pi/6}$, −1, $e^{j4\pi/6}$, $e^{j2\pi/6}$] for the CQI UE6.

Figure 15:
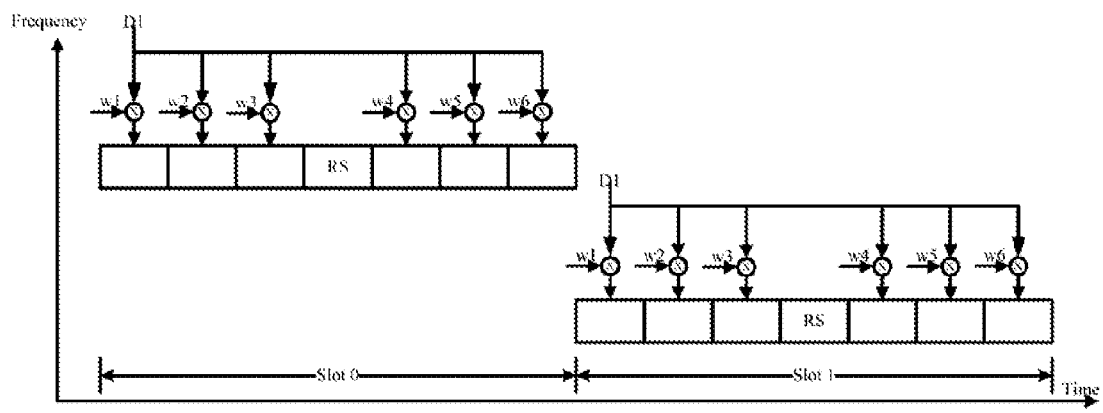
FIG. 15 illustrates an embodiment in which six UEs are supported so that 24-bit encoded CQI bits of each UE can be transmitted with frequency hopping.

Similarly FIG. 15 illustrates the use of a frequency-hopping mode in which six CQI UEs can be supported in a PRB and each CQI UE can transmit 24 CQI bits.

Seventh Embodiment

Figure 16:
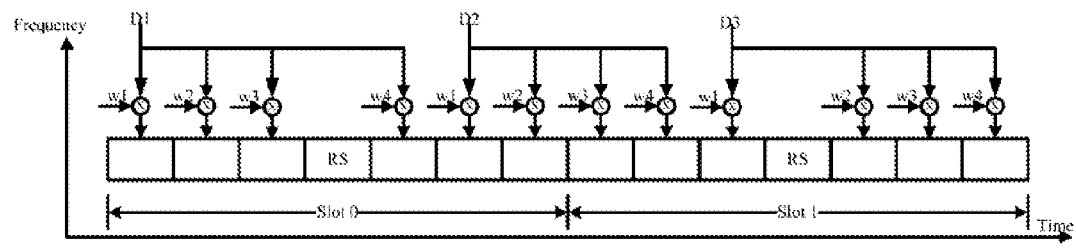
FIG. 16 illustrates an embodiment in which four UEs are supported so that 72-bit encoded CQI bits of each UE can be transmitted without frequency hopping.
Figure 17:
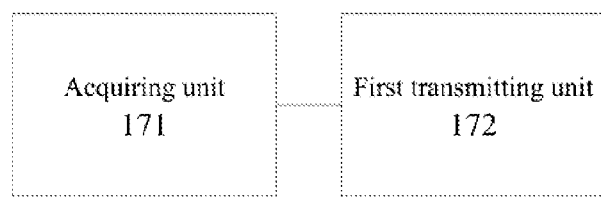
FIG. 17 is a schematic structural diagram of a transmitting device according to an embodiment of the invention.

FIG. 16 illustrates the use of a time-domain CDM mode in which four CQI UEs are supported in a PRB. Each CQI UE can transmit 72 encoded CQI bits in a sub-frame. Particularly [D1, D2, D3] represents corresponding CQI data. A sub-frame in the figure includes 14 symbols numbered 1 to 14, the number of none of the symbols is illustrated in the figure, and they are numbered in the same order as in FIG. 4. There are three CQI data symbols for a UE. A time-frequency resource includes three sets of data time-domain units, and a CQI data symbol corresponds to one set of data time-domain units. Particularly the set of data time-domain units 1 includes a symbol 1 to a symbol 3 and a symbol 5, and the set of data time-domain units 2 includes a symbol 6 to a symbol 9, and the set of data time-domain units 3 includes a symbol 10 and a symbol 12 to a symbol 14. Each symbol is a data time-domain unit. In an OFDM system, each data time-domain unit corresponds to one OFDM symbol. With the use of a QPSK modulation mode, each CQI data symbol Di includes 24 encoded CQI bits. All of w1, w2, w3 and w4 are scalars. As illustrated in FIG. 17, each CQI data symbol is multiplied by corresponding wi and then transmitted in an OFDM symbol. [w1, w2, w3, w4] of the different UEs are orthogonal. Any orthogonal sequence can be taken as [w1, w2, w3, w4]. For example:

There are [w1, w2, w3, w4]=[1, 1, 1, 1] for the CQI UE1,

[w1, w2, w3, w4]=[1, −1, 1, −1] for the CQI UE2,

[w1, w2, w3, w4]=[1, 1, −1, −1] for the CQI UE3, and

[w1, w2, w3, w4]=[1, −1, −1, 1] for the CQI UE4.

It shall be noted that FIG. 4 to FIG. 17 illustrates those scenarios merely relating to various embodiments of the invention. The following variations can be encompassed in the scope of the invention:

For example, each sub-frame can include one, two or more slots; the number of OFDM symbols in each slot can be other than seven, for example, there are six OFDM symbols in each slot with an extended CP in the 3GPP LTE; the number of RS OFDM symbols in each slot can be one or more; RS OFDM symbols and data OFDM symbols in each slot can be located differently from those in the embodiments of the invention; a plurality of OFDM symbols corresponding to each CQI symbol Di with the use of CDM in the time domain can be different from those in the embodiments of the invention; each CQI symbol Di can result from OFDM modulation or single-carrier OFDM modulation; a PRB can be constituted of more or less than 12 REs, and the size of each RE in the frequency domain can be different from 15 KHz; and the invention can be extended to support other numbers of CQI UEs in a PRB than supporting 1, 2, 3, 4 and 6 CQI UEs in a PRB as described in the embodiments. The idea of the invention can be applicable to transmission of other control information or data, e.g., other control information than a CQI, etc.

An embodiment of the invention provides a system for transmitting channel quality indicator information of a plurality of user equipments, which includes at least two user equipments, where:

Each user equipment is configured to transmit channel quality indicator information on the same time-frequency resource including at least one frequency-domain unit in the frequency domain and at least two sets of data time-domain units in the time domain, each of which is consisted of at least two data time-domain units, and the channel quality indicator information is transmitted in a time-domain code division multiple access mode on at least one set of data time-domain units.

Each of the user equipments is configured to generate more than one channel quality indicator symbol from the channel quality indicator information and to multiply each channel quality indicator symbol by a corresponding element in a preset time-domain frequency-spreading code and then transmit the product in a corresponding data time-domain unit, where:

Each channel quality indicator symbol corresponds to at least one set of data time-domain units, the time-domain frequency-spreading code includes the same number of elements as the number of data time-domain units in each set of data time-domain units, and each element in the time-domain frequency-spreading code corresponds to one of the data time-domain units in the corresponding set of data time-domain units.

Different channel quality indicator symbols can correspond to different sets of data time-domain units, or all the sets of data time-domain units can correspond to the same channel quality indicator symbol. The time-domain frequency-spreading codes of the different user equipments on the same time-frequency resource are orthogonal in the set of data time-domain units.

Each of the user equipments is configured to transmit a reference signal in at least one reference signal time-domain unit, and the time-frequency resource further includes a set of reference signal time-domain units including at least one reference signal time-domain unit. The reference signals transmitted from the different user equipments on the same reference signal time-domain resource are orthogonal in the at least one reference signal time-domain unit.

Referring to FIG. 17, an embodiment of the invention provides a device for transmitting channel quality indicator information, which includes:

An acquiring unit 171 configured to generate channel quality indicator information; and A first transmitting unit 172 configured to transmit the channel quality indicator information on a preset time-frequency resource by transmitting the channel quality indicator information in a time-domain code division multiple access mode on at least one set of data time-domain units in the time-frequency resource, where the time-frequency resource includes at least one frequency-domain unit in the frequency domain and at least two sets of data time-domain units in the time domain, each of which includes at least two data time-domain units.

The first transmitting unit 172 is configured to generate more than one channel quality indicator symbol from the channel quality indicator information and to multiply each channel quality indicator symbol by a corresponding element in a preset time-domain frequency-spreading code and then transmit the channel quality indicator symbol in a corresponding data time-domain unit, where each channel quality indicator symbol corresponds to at least one set of data time-domain units, the time-domain frequency-spreading code includes the same number of elements as the number of data time-domain units in each set of data time-domain units, and each element in the time-domain frequency-spreading code corresponds to one of the data time-domain units in the corresponding set of data time-domain units.

Different channel quality indicator symbols can correspond to different sets of data time-domain units, or all the sets of data time-domain units can correspond to the same channel quality indicator symbol. The time-domain frequency-spreading codes of different user equipments on the same time-frequency resource are orthogonal in the set of data time-domain units.

The device further includes a second transmitting unit 173 configured to transmit a reference signal in a preset reference signal time-domain unit, where the time-frequency resource further includes a set of reference signal time-domain units including at least one reference signal time-domain unit. The reference signals transmitted from different user equipments on the same reference signal time-domain resource are orthogonal in the at least one reference signal time-domain unit.

Figure 18:
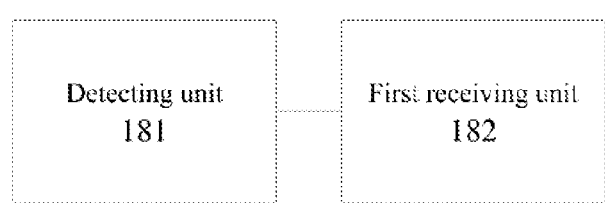
FIG. 18 is a schematic structural diagram of a receiving device according to an embodiment of the invention.

Referring to FIG. 18, an embodiment of the invention provides a device for receiving channel quality indicator information, which includes:

A detecting unit 181 configured to detect a time-frequency resource; and

A first receiving unit 182 configured to receive channel quality indicator information on a detected preset time-frequency resource by receiving the channel quality indicator information in a time-domain code division multiple access mode on at least one set of data time-domain units in the detected preset time-frequency resource, where the time-frequency resource includes at least one frequency-domain unit in the frequency domain and at least two sets of data time-domain units in the time domain, each of which includes at least two data time-domain units.

The first receiving unit 182 is configured to receive a signal in a corresponding data time-domain unit according to a preset time-domain frequency-spreading code, where the signal is the product of each channel quality indicator symbol multiplied by a corresponding element in the corresponding time-domain frequency-spreading code.

Different channel quality indicator symbols can correspond to different sets of data time-domain units, or all the sets of data time-domain units can correspond to the same channel quality indicator symbol. The time-domain frequency-spreading codes of different user equipments on the same time-frequency resource are orthogonal in the set of data time-domain units.

The device further includes a second receiving unit 183 configured to receive a reference signal in a preset reference signal time-domain unit, where the time-frequency resource further includes a set of reference signal time-domain units including at least one reference signal time-domain unit.

In the embodiments of the invention, a plurality of user equipments can transmit their respective channel quality indicator information on the same time-frequency resource, and the channel quality indicator information of each user equipment is transmitted in a time-domain code division multiple access mode on at least one set of data time-domain units.

Therefore the number of transmitted bits can be adjusted according to the size of each piece of channel quality indicator information.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A method for transmitting channel quality indicator information of multiple user equipments, the method comprising:
   at least two user equipments transmitting their respective channel quality indicator information on the same time-frequency resource comprising at least one frequency-domain unit in the frequency domain and at least two sets of data time-domain units in the time domain, wherein each set of data time-domain unit comprises at least two data time-domain units, and the channel quality indicator information of different user equipments is transmitted on at least one set of data time-domain units in a time-domain code division multiple access mode;
   and wherein transmitting the channel quality indicator information of different user equipments in the time-domain code division multiple access mode on at least one set of data time-domain units comprises:
   each of the user equipments generating a corresponding number of channel quality indicator symbols according to an amount of the channel quality indicator information of the user equipment to be transmitted on the time-frequency resource, wherein each channel quality indicator symbol corresponds to at least one set of data time-domain units,
   presetting a time-domain frequency-spreading code comprising the same number of elements as the number of data time-domain units in each set of data time-domain units, wherein each element in the time-domain frequency-spreading code corresponds to one of the data time-domain units in the corresponding set of data time-domain units, and
   multiplying each channel quality indicator symbol by the corresponding element in the time-domain frequency-spreading code and then transmitting the product in the corresponding data time-domain unit.

2. The method of claim 1, wherein different channel quality indicator symbols correspond to different sets of data time-domain units.

3. The method of claim 1, wherein all the sets of data time-domain units correspond to the same channel quality indicator symbol.

4. The method of claim 1, wherein the time-domain frequency-spreading codes of the different user equipments on the same time-frequency resource are orthogonal in the set of data time-domain units.

5. The method of claim 1, wherein the time-frequency resource further comprises a set of reference signal time-domain units comprising at least one reference signal time-domain unit, and the method further comprises the at least two user equipments transmitting reference signals in at least one reference signal time-domain unit.

6. The method of claim 5, wherein the reference signals transmitted from the different user equipments on the same reference signal time-domain resource are orthogonal in the at least one reference signal time-domain unit.

7. A device for transmitting channel quality indicator information, the device comprising:
   an acquiring unit configured to generate channel quality indicator information; and
   a first transmitting unit configured to transmit the channel quality indicator information on a preset time-frequency resource, wherein the channel quality indicator information generated by acquiring units of different devices is transmitted on at least one set of data time-domain units in the time-frequency resource in a time-domain code division multiple access mode, and wherein the time-frequency resource comprises at least one frequency-domain unit in the frequency domain and at least two sets of data time-domain units in the time domain, each of which comprises at least two data time-domain units;
   and the first transmitting unit is further configured to generate a corresponding number of channel quality indicator symbols from an amount of the channel quality indicator information, generated by the acquiring unit of the device, to be transmitted on the time-frequency resource and to multiply each channel quality indicator symbol by a corresponding element in a preset time-domain frequency-spreading code and then transmit the product in a corresponding data time-domain unit, wherein:

each channel quality indicator symbol corresponds to at least one set of data time-domain units, the time-domain frequency-spreading code comprises the same number of elements as the number of data time-domain units in each set of data-time domain units, and each element in the time-domain frequency-spreading code corresponds to one of the data time-domain units in the corresponding set of data time-domain units.

8. The device of claim 7, wherein different channel quality indicator symbols correspond to different sets of data time-domain units.

9. The device of claim 7, wherein all the sets of data time-domain units correspond to the same channel quality indicator symbol.

10. The device of claim 7, further comprising:
a second transmitting unit configured to transmit a reference signal in a preset reference signal time-domain unit, wherein:
the time-frequency resource further comprises a set of reference signal time-domain units comprising at least one reference signal time-domain unit.

* * * * *